United States Patent
Simpson

(10) Patent No.: US 6,627,017 B2
(45) Date of Patent: Sep. 30, 2003

(54) SELF-ADHESIVE LAMINATE FOR SEALING WINDOW FRAMES AND METHOD OF SEALING WINDOW FRAMES

(75) Inventor: Robert S. Simpson, Coshocton, OH (US)

(73) Assignee: MFM Building Products Corp., Coshocton, OH (US)

( * ) Notice: Subject to any disclaimer, the term of this patent is extended or adjusted under 35 U.S.C. 154(b) by 0 days.

(21) Appl. No.: 10/269,591

(22) Filed: Oct. 11, 2002

(65) Prior Publication Data

US 2003/0039789 A1 Feb. 27, 2003

Related U.S. Application Data

(62) Division of application No. 09/627,635, filed on Jul. 28, 2000, now Pat. No. 6,479,119.

(51) Int. Cl.[7] .............................. B32B 31/00; E06B 1/04
(52) U.S. Cl. ............................ 156/71; 52/202; 52/213; 52/204.5; 428/41.1; 428/41.3
(58) Field of Search ................................ 428/40.1, 40.9, 428/41.1, 41.3, 148, 214, 215, 220, 489; 52/202, 204.1, 204.5, 213, 415, 416; 156/71

(56) References Cited

U.S. PATENT DOCUMENTS

| | | | |
|---|---|---|---|
| 3,937,640 A | | 2/1976 | Tajima et al. |
| 4,055,453 A | | 10/1977 | Tajima et al. |
| 4,374,687 A | | 2/1983 | Yamamoto |
| 4,386,981 A | | 6/1983 | Clapperton |
| 4,396,981 A | * | 8/1983 | Terakawa et al. ............ 711/213 |
| 4,509,999 A | * | 4/1985 | Sandor ......................... 156/71 |
| 4,514,442 A | | 4/1985 | Crepeau |
| 4,589,804 A | | 5/1986 | Paeglis et al. |
| 4,670,071 A | | 6/1987 | Cooper et al. |
| 5,096,759 A | | 3/1992 | Simpson et al. |
| 5,705,002 A | * | 1/1998 | Sherry ......................... 156/71 |
| 5,972,453 A | * | 10/1999 | Akiwa et al. .............. 428/40.1 |
| 6,576,316 B2 | * | 6/2003 | Simons et al. ............. 428/40.1 |
| 2002/0108326 A1 | * | 8/2002 | Ackerman ................. 52/204.5 |

* cited by examiner

*Primary Examiner*—Mark A. Osele
(74) *Attorney, Agent, or Firm*—Francis T. Kremblas, Jr.; Kremblas, Foster, Phillips & Pollick

(57) ABSTRACT

A self-adhesive laminate for sealing window frames includes an aluminum layer having a first side and a second side, a polyester layer adhered to the first side of the aluminum layer, an adhesive layer adhered to the second side of the aluminum layer, and a release paper overlying the adhesive remote from the aluminum layer. This laminate reduces or eliminates the overheating problems common in prior art tapes.

13 Claims, 2 Drawing Sheets

SELF-ADHESIVE LAMINATE FOR SEALING WINDOW FRAMES AND METHOD OF SEALING WINDOW FRAMES

CROSS-REFERENCES TO RELATED APPLICATIONS

This application is a division of co-pending application Ser. No. 09/627,635 filed on Jul. 28, 2000 now U.S. Pat. No. 6,479,119.

(Not Applicable)

STATEMENT REGARDING FEDERALLY-SPONSORED RESEARCH AND DEVELOPMENT (Not Applicable)

Reference to a "Microfiche Appendix"

(Not Applicable)

BACKGROUND OF THE INVENTION

1. Field of the Invention

This invention relates generally to a self-adhesive laminate and a method for using this laminate for sealing window frames.

2. Description of the Related Art

In building construction, prefabricated windows are supplied with a metal flange along their perimeter. This flange is nailed to the building sub-siding. The finish siding is then applied over the flange. The flange is not tightly sealed to the sub-siding and wind-driven rain can cause water leaks around the flange. These leaks can be prevented if a layer of tape is applied to seal the joint between the flange and sub-siding.

Various types of adhesive tapes or laminates have been used to seal these flanges. These laminates generally are dark-colored and comprise a polyethylene film adhered to a bitumen layer. However, the use of such a tape has several disadvantages.

First, due to the dark color of the tape, exposure to sunlight causes it to become heated above ambient temperatures. This can cause difficulty in application of the tape and creates problems with adequate adhesion at higher temperatures, causing the seal formed upon application of the tape to deteriorate. Even if a light-colored polyethylene is used, the tape still absorbs sufficient heat to adversely affect adhesion.

Second, polyethylene film is easily stretched. If the tape is overstretched, it will tend to contract over time and pull away from the underlying flange. This too creates a deterioration in the seal.

Finally, the polyethylene absorbs oils present in many adhesive compounds. This causes the polyethylene to swell and wrinkle, also causing a breakdown in the seal formed.

Some prior art adhesive laminates include a variety of layers. However, these laminates are not feasible for use in the present application. First, these products are designed to be used on roofing. Roofing uses require a greater degree of strength, due to the nature of their function and the long exposure to the elements of nature. The roofing membranes currently used are also significantly thicker and less flexible than the self-adhesive laminate disclosed herein. Use of such roofing membranes for sealing window frames would be economically impractical due to significantly increased material cost in making the laminate and the increased labor in applying the laminate, due to its stiffness relative to the present invention. Examples of such laminates are shown in the U.S. patents to Tajima et al., U.S. Pat. Nos. 3,937,640 and 4,055,453; Yamamoto, U.S. Pat. No. 4,374,687; Clapperton, U.S. Pat. No. 4,386,981; Crepeau, U.S. Pat. No. 4,514,442; Paeglis et al., U.S. Pat. No. 4,589,804; Cooper et al., U.S. Pat. No. 4,670,071; and Simpson et al., U.S. Pat. No. 5,096,759.

The present invention solves these and other problems present in the prior art by providing a number of features. First, the present invention uses a sheet of transparent or translucent material with a low degree of elasticity, the latter feature tending to prevent overstretching. Next, the present invention incorporates a reflective layer to prevent the overheating of the laminate. Finally, the present invention places the reflective layer between the translucent or transparent sheet of material and the adhesive to prevent oils from migrating from the adhesive and into the sheet of material. In these ways, the present invention is a significant improvement over the prior art.

BRIEF SUMMARY OF THE INVENTION

The present invention relates to a self-adhesive laminate for sealing window frames. The laminate includes a polyester layer, an aluminum layer, an adhesive layer, and preferably a removable paper or plastic layer overlying the adhesive layer. The removable layer is referred to herein as a release layer.

The aluminum layer has a first side and an opposing second side. The polyester layer is adhered to the first side of the aluminum layer. The adhesive layer is applied to the second side of the aluminum layer. The release layer overlies the adhesive remote from the aluminum layer.

The aluminum layer preferably is between about 10 nm and about 100 nm thick. The polyester layer is preferably transparent or translucent and is between about 0.00045 in. and about 0.002 in. thick. The adhesive layer is preferably pressure-sensitive and is between about 0.015 in. and about 0.060 in. thick. The aluminum and polyester are preferably adhered to one another by depositing the aluminum layer on the polyester layer by vapor deposition.

The adhesive is preferably based on rubberized asphalt, butyl rubber, or polyisobutylene. The adhesive is most preferably a rubberized asphalt comprising asphalt, thermoplastic elastomers, process oil, and tackifying resins.

Figure 1:
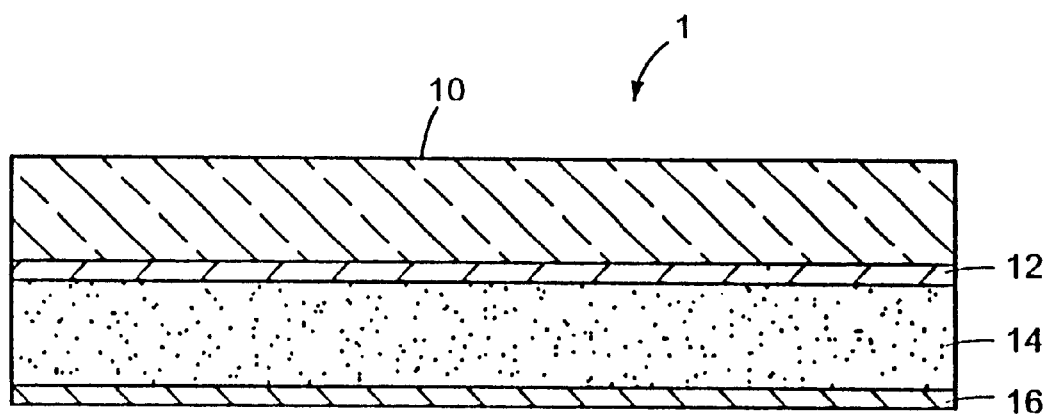
FIG. 1 is a sectional view of the self-adhesive laminate according to the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art. In addition, many elements are illustrated which are of a type which perform well-known operations. Those skilled in the art will recognize that there are many, and in the future may be additional, alternative elements which are recognized as equivalent because they provide the same operations.

DETAILED DESCRIPTION OF THE INVENTION

The present invention relates to a self-adhesive laminate 1 used in sealing window frames. The laminate includes three primary elements, a polyester layer 10, a metallic aluminum layer 12, and an adhesive layer 14.

The polyester layer 10 and the aluminum layer 12 are preferably integrally formed. The aluminum layer 12 may be deposited on the polyester layer 10 in any manner which is commonly used in the industry, such as via vapor deposition techniques, for example, or other equivalent means. The polyester film is preferably between about 0.00045 in. and about 0.02 in. thick. The aluminum layer is preferably between about 10 nm and about 100 nm thick.

An adhesive layer 14 is adhered to the side of the aluminum layer 12 remote from the polyester layer 10. The adhesive layer 14 is preferably a rubberized asphalt, most preferably made from asphalt, thermoplastic elastomers, process oil and tackifying resins. Alternatively, the adhesive layer 14 is an adhesive based on butyl rubber or polyisobutylene. The adhesive layer 14 preferably has a thickness between about 0.015 in. and about 0.060 in. A release layer 16 is applied to be adjacent the adhesive layer 14, remote from the aluminum layer 11.

It is important that the aluminum layer 12 be placed between the adhesive layer 14 and the polyester layer 10.

The adhesives used in the adhesive layer 14 tend to include oils, such as the process oil mentioned above. In prior art devices, the adhesive layer is placed adjacent a polyethylene sheet. Over time, the oils from the adhesive layer contact the polyethylene sheet and, to a certain extent, leach into or are absorbed by the polyethylene sheet. This leaching causes the polyethylene sheet to swell, wrinkle, degrade and fail over time. In the present invention, the aluminum layer 12 between the polyester layer 10 and the adhesive layer 14 acts as a barrier to the oils in the adhesive layer relative to the polyester sheet 10. The oils do not degrade the aluminum layer 12 and are not transferred through the aluminum layer to the polyester sheet 10. Therefore, the polyester sheet 10 is not subject to degradation by these oils to the extent present in the prior art. Further, since the polyester layer 10 is relatively strong, it provides protection to the aluminum layer from exposure to the elements and contact with outside agencies.

Use of the polyester sheet 10, rather than the polyethylene sheet used in the prior art is also highly preferred. Polyester and polyethylene have very different elasticities. When a polyethylene sheet is used, a person applying such an adhesive tape can relatively easily overstretch the tape. Over time, the tape is likely to contract and separate from the wall surface to which the tape is applied. A polyester sheet, as is used in the present invention, has a lower degree of elasticity than the polyethylene sheet used in the prior art tapes. This characteristic reduces this type of human error during use because the risk of overstretching is significantly minimized. In testing, the vastly different elasticities become apparent. A polyethylene film having a thickness of 0.0015 in. was tested and found to have an elongation of 264% and a breaking strength of 5.5 lbs./in. A polyester film having a thickness of 0.00075 in., i.e., half the thickness of the polyethylene film, when subjected to the same tests, was found to have an elongation of 69% and a breaking strength of 21 lbs./in.

It is also preferred that the polyester layer be translucent or transparent. Such a polyester layer permits ambient light, specifically sunlight, to penetrate the polyester layer and reflect from the aluminum layer. This reflection of light permits the adhesive layer to remain at a temperature which is close to ambient temperature. In the construction of homes and other buildings, the installation of window frames and the application of an adhesive tape to seal the joint with the sub-siding may occur several days or weeks before the installation of the final siding material. Therefore, the tape is exposed to sunlight, rain, wind, and the like. It is important that the sealing function of the tape remain effective, particularly during this openly exposed time period prior to installation of the overlying final siding layers.

Exposure of the prior art adhesive laminates to sunlight causes the temperature of those adhesives to significantly increase and represents a significant problem unsolved by those in the field for many years. The prior art laminates using a dark colored polyethylene film can be heated on a typical summer day to a temperature as much as 25 degrees F. higher than ambient temperature. Even using a light colored polyethylene film in such laminates as those used in the prior art, the temperature of the adhesive layer can rise to as much as 10–15 degrees F. higher than ambient temperature. When the temperature of the adhesive increases to this degree, the tape can become hot to the touch, making it difficult to handle and more difficult to apply properly. In addition, when the temperature of the adhesive is too high, the adhesive layer loses some of its tackiness and may not form a proper seal or the originally formed seal may degrade after application to cause failure of the sealing function. It is therefore highly preferred to use a translucent or transparent polyester sheet with the aluminum layer in accordance with the present invention to reflect light and heat to prevent overheating of the laminate tape and the detrimental consequences thereof.

The adhesive laminate is used as a moisture seal around windows in new construction and replacement installations. It may also be used as an underlayment to seal joints and other openings beneath a variety of exterior surfaces including brick, stucco, wood, and vinyl or metal siding. The laminate may be applied directly to most vertical or horizontal surfaces, including surfaces made of wood, composition wood panels, metal, vinyl, and masonry. For best results, the surface to which the laminate is to be applied is preferably clean, dry, and free from oil, grease, and debris. Dirty, dusty or weathered surfaces should be primed with a water-based, polymer-based, or solvent-based primer to obtain a clean, smooth surface, prior to application of the laminate. The laminate may be attached with mechanical fasteners, such as nails, screws, staples, or other types of fasteners, if the surface cannot be made reasonably smooth. The laminate is preferably applied at temperatures above 50 degrees F.

Figure 2:
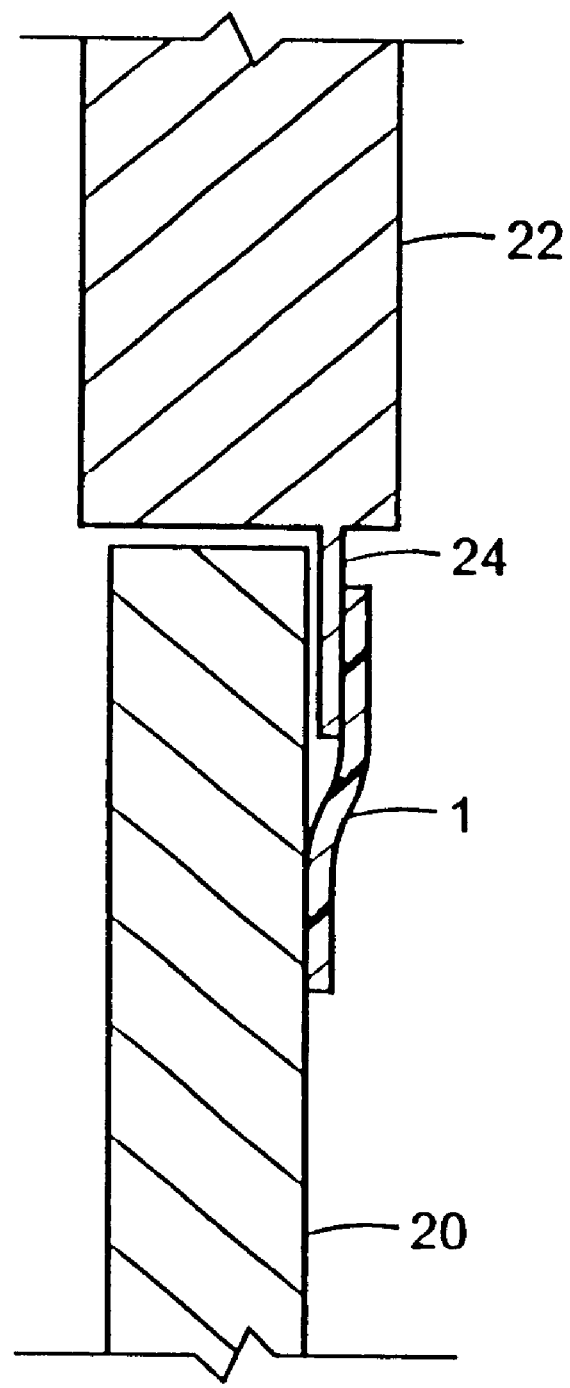
FIG. 2 is a partial sectional view of the self-adhesive laminate in use to seal the joint between a window frame and an adjacent wall.

An example of the use of the laminate 1 is shown in FIG. 2. FIG. 2 shows a wall 20 in which a window frame 22 has been placed. A flange 24 extends from the window frame 22 adjacent the wall 20. The laminate 1 is applied in a sealingly disposed overlying relationship across the flange 24 and wall 20. The laminate 1 engages the flange 24 and the wall 20 and the seam between the flange 24 and the wall 20 as is described below.

The laminate is applied along the window flange or other joint to join the flange to the surrounding surfaces, such as the outer wall. It is installed by removing the release layer 16 and pressing the adhesive layer 14 onto the surface. The laminate may be cut to fit an appropriate length using scissors or a utility knife.

The sheet of laminate is preferably unrolled gradually, without stretching. The release layer is removed and the adhesive pressed against the surface. Any air pockets should be eliminated. A hand-held roller may be used along seams to ensure smooth, uninterrupted contact between the surface and the laminate.

If the laminate is being applied around a window, it is important that it be applied to cause water not to flow into overlapping areas. Preferably, strips of the laminate are applied along the bottom of the window. Then, strips are applied along the sides of the window, overlapping the portion applied to the bottom. Finally, strips are applied at the top of the window, overlapping the strips applied to the sides. The strips should be overlapped between about 3 in. and about 6 in.

While certain preferred embodiments of the present invention have been disclosed in detail, it is to be understood that various modifications may be adopted without departing from the spirit of the invention or scope of the following claims.

What is claimed is:

1. A method for sealing window frames provided with a surrounding flange installed in a wall section of a building comprising, in combination, the steps of:
   a) providing a laminate strip comprising a layer of aluminum adhered between an adhesive layer and a polyester layer:
   b) applying said laminate in overlying and sealing relationship to a portion of the surrounding flange of the window frame and the surface of the adjacent wall section to seal a seam formed by an edge of the frame and adjacent surface of the wall section with said adhesive layer engaging the flange of the window frame and the adjacent wall section and the polyester layer facing outwardly relative to the adhesive layer.

2. The method according to claim 1 wherein said layer of aluminum has a thickness of between about 10 nm and 100 nm.

3. The method according to claim 1, wherein the polyester layer has a thickness between about 0.00045 in. and about 0.0002 in.

4. The method according to claim 1, wherein the polyester layer is transparent.

5. The method according to claim 1, wherein the polyester layer is translucent.

6. The method according to claim 1, wherein the adhesive layer is pressure-sensitive.

7. The method according to claim 1, wherein the adhesive layer has a thickness between about 0.015 in. and about 0.060 in.

8. The method according to claim 1, wherein adhesive layer comprises rubberized asphalt.

9. The method according to claim 1, herein the rubberized asphalt comprises asphalt, thermoplastic elastomers, process oil, and tackifying resins.

10. The method according to claim 1, wherein the adhesive layer comprises a butyl rubber-based adhesive.

11. The method according to claim 1, wherein the adhesive layer comprises a polyisobutylene-based adhesive.

12. The method according to claim 1, wherein the layer of aluminum is applied to the polyester layer by vapor deposition.

13. The method according to claim 1, further comprising a release layer overlying the adhesive remote from the aluminum layer.

* * * * *